United States Patent [19]

Morrison et al.

[11] 4,403,600

[45] Sep. 13, 1983

[54] MODULAR SOLAR HEATING SYSTEM

[76] Inventors: Herbert F. Morrison, R.D. No. 7, 46 Boniello Dr., Mahopac, N.Y. 10541; David A. Miller, 2 Beverly La., Marlborough, Conn. 06447

[21] Appl. No.: 327,955

[22] Filed: Dec. 7, 1981

[51] Int. Cl.³ .............................................. F24J 3/02
[52] U.S. Cl. ................................. 126/429; 126/450; 126/445
[58] Field of Search ............... 126/428, 429, 431, 432, 126/422, 450, 444, 445, 448, 417

[56] References Cited

U.S. PATENT DOCUMENTS

| 246,626 | 9/1881 | Morse | 126/429 |
|---|---|---|---|
| 3,946,720 | 3/1976 | Keyes et al. | 126/429 |
| 4,098,260 | 7/1978 | Goettl | 126/429 |
| 4,100,914 | 7/1978 | Williams | 126/429 |
| 4,121,565 | 10/1978 | Grisbrook | 126/429 |
| 4,186,720 | 2/1980 | Schmauder, Sr. et al. | 126/445 |
| 4,212,292 | 7/1980 | Reinert | 126/429 |
| 4,271,824 | 6/1981 | Decker | 126/429 |
| 4,296,798 | 10/1981 | Schramm | 126/431 |
| 4,304,220 | 12/1981 | Brockhaus | 126/422 |
| 4,323,054 | 4/1982 | Hummel | 126/431 |

Primary Examiner—James C. Yeung

[57] ABSTRACT

An active solar heating system, adapted for retrofit installation in a building, consists of a solar collector module and a plenum box assembly, the latter including flexible conduits which are connected to the module for actively circulating room air therethrough. The system enables the utilization of solar collector modules that are constructed in standard four by eight dimensions, while accommodating the necessity for misalignment of the room register and the air flow apertures of the module.

6 Claims, 8 Drawing Figures

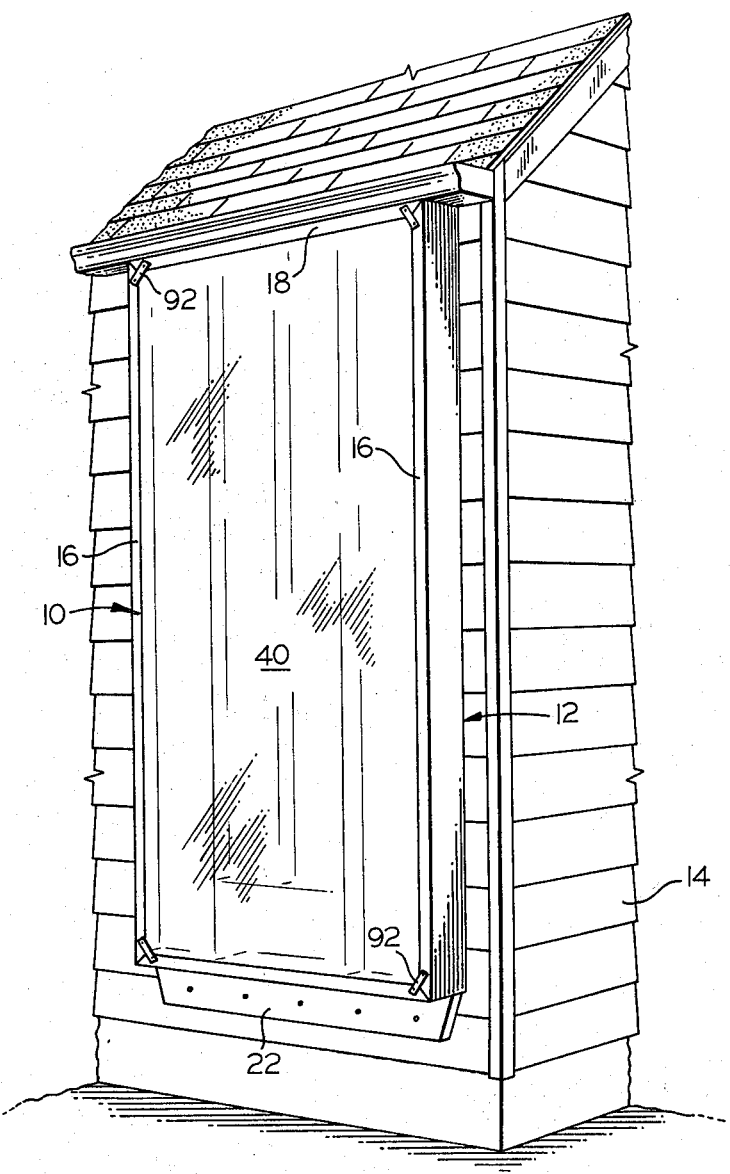
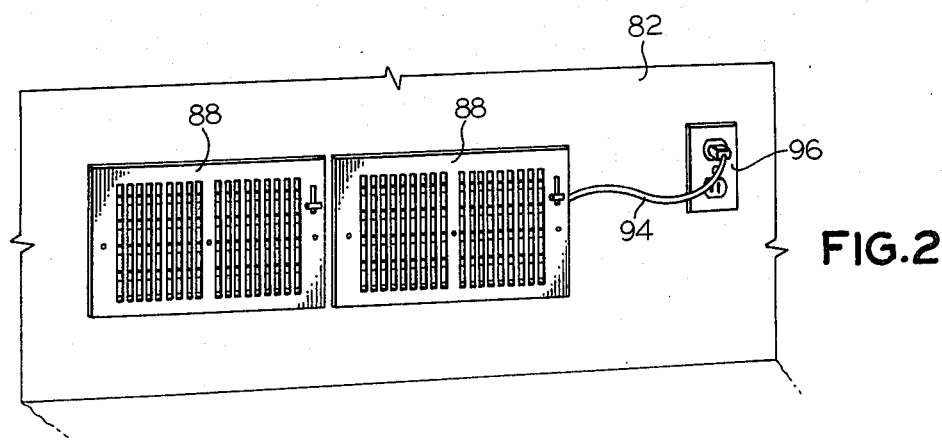
FIG.1
FIG.2

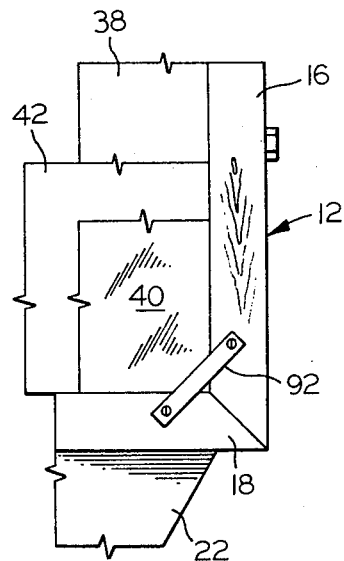
FIG.6
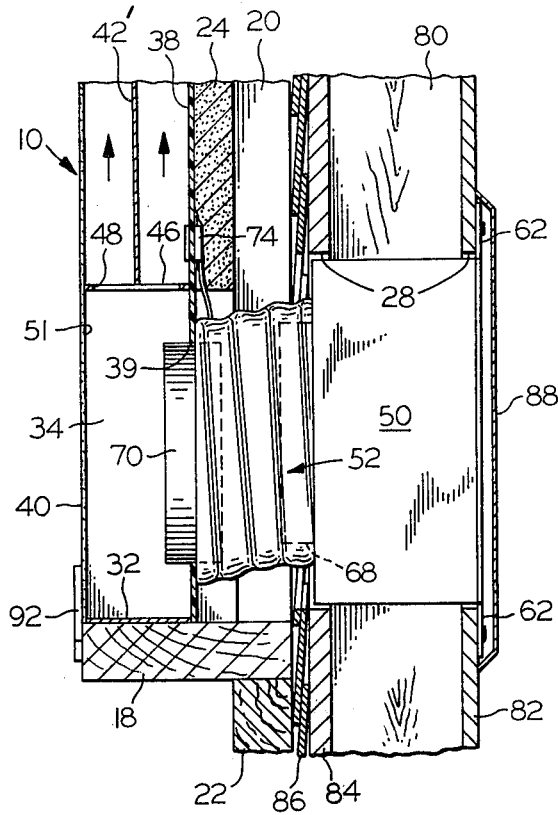
FIG.7
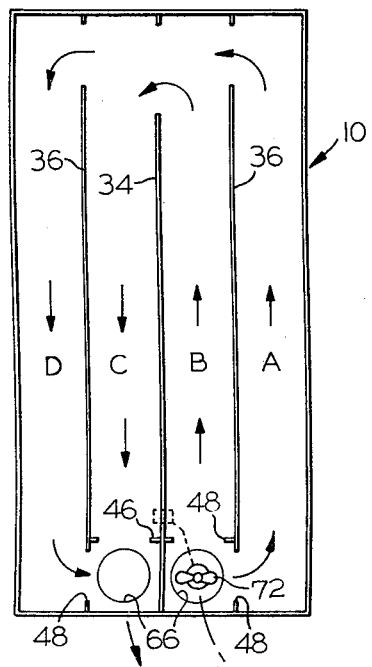
FIG.8
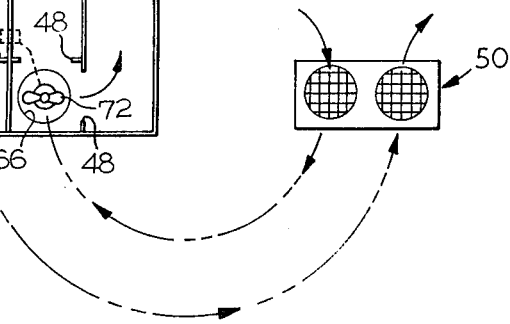

MODULAR SOLAR HEATING SYSTEM

BACKGROUND OF THE INVENTION

With the ever-growing, world-wide emphasis upon energy conservation, much attention is now being devoted to the provision of means by which solar energy can be exploited efficiently and practically, to satisfy a substantial proportion of normal heating demands. In response, numerous active and passive solar collector systems have been proposed, both as an integral part of a house or other building and also for retrofit installation in existing structures.

Such retrofit systems, which are generally either window units or outside-mounted modular panels, are normally of limited dimensions to enable facile installation, and are not therefor very efficient sources of supplementary heat. The window units must, of course, be sufficiently small to fit within the opening of a standard window; moreover, they typically have attached accordian-pleated side panels which expand to the window frame, through which thermal energy transfer, and consequential substantial heat loss, readily occurs. Normally, the exterior modular units are shallow rectangular panels that do not exceed three feet in width and seven feet in length, thus providing a maximum effective heat absorption and energy conversion area of about twenty-one square feet.

Active and passive solar collector modules, made for integration into new constructions and for replacement of existing wall sections are, like panels of sheetrock, plywood, etc., produced in standard 4'×8' dimensions. While these modules provide approximately 50 percent more effective surface area than does a 3'×7' unit, as far as is known such a module has not heretofore been utilized successfully for retrofit exterior mounted installation as an active system, due to the difficulty of establishing air flow communication therewith into the living space.

More particularly, in such a unit the inlet and outlet openings for air are generally provided closely adjacent one of its ends. Because the standard house wall height is eight feet, this presents little difficulty in the case of a panel that is only seven feet long. However, when the panel is eight feet in length, direct air flow connections through the wall are either impossible, or are made only with considerable effort and structural modification, due to the presence of sills, plates, and the like, at the bottom and top of the wall structure. Moreover, for practical and aesthetic reasons it will often be desirable to locate the room air flow register at a position other than in direct alignment with the openings in the collector panel; for example, this may be necessary to avoid interference with radiators or baseboard heating units, or to prevent blockage by drapes, furniture, etc.

Accordingly, it is a primary object of the invention to provide a novel active solar heating system which is adapted for retrofit installation in a building with minimal structural modification thereto, which system utilizes a solar collector module of a standard size and relatively large effective surface area for difficult heat recovery and utilization.

It is also an object of the invention to provide such a system which permits facile placement of the room register to accommodate practical and aesthetic factors.

It is another object of the invention to provide a system of the foregoing nature which is compact and self-contained, and which can be produced and installed quickly, easily, and relatively inexpensively.

SUMMARY OF THE INVENTION

It has now been found that the foregoing and related objects of the present invention are readily attained in a system that is comprised of a solar collector module and a plenum box assembly. The collector module is adapted for mounting upon the exterior of a building wall, and includes a frame having disposed therein a transparent front wall panel and a spaced, parallel rear wall panel, which define an air flow space therebetween. At least one member is provided within the module to divide the air flow space thereof into two chambers, in a plane that is perpendicular to the planes of the front and rear wall panels. The rear wall panel has a pair of adjacent apertures formed therethrough near one end of the module, which apertures are isolated from one another by the dividing member, with one of them communicating with each of the chambers of the air flow space. The chambers are in air flow communication with one another adjacent the opposite end of the module, as the result of which a double-pass air flow path is established therethrough between the apertures. The plenum box assembly includes a box defining a plenum with an open front side, which box is adapted for installation in an opening formed through the building wall with the open side disposed to the interior and lying substantially in the plane of the inside wall surface. An internal barrier member divides the plenum into two adjacent compartments, and a rear wall of the box has a pair of passages formed therethrough, each communicating with one of the plenum compartments. A pair of flexible conduits connects the box and the collector module, with one of the conduits providing air flow communication between one of the compartments of the plenum box and one of the chambers of the module through the passages and apertures thereof, respectively. The plenum box assembly also includes blower means mounted substantially within one of the conduits, which serves to induce air flow circulation. Consequently, the system is readily installed by forming an opening through an outside wall of the building, mounting the module on the exterior surface thereof and mounting the plenum box within the spring, and establishing air flow communication between the module and the box by connecting the conduits therebetween. The flexibility of the conduits permits the plenum box to be disposed other than with the passages thereof in alignment with the apertures of the module.

Preferably, the solar collector module will additionally include at least one panel for absorption of solar radiation and conversion of such radiation into thermal energy. Such a panel will normally be spaced between, and in a plane parallel to, the front and rear wall panels of the unit, to subdivide the chambers of the module and thereby define air flow passages on both sides of the absorption panel; generally, the module will include a plurality of the dividing members. Most desirably, the module will be about eight feet long and four feet wide, to maximize the surface area available for solar radiation absorption, and to conform to standard residential dimensioning practices. Other objects are attained in a method of retrofitting a solar collector module into an existing building structure, to produce an active supplemental heating system.

BRIEF DESCRIPTION OF THE DRAWINGS

FIG. 1 is a fragmentary perspective view of a solar collector module embodying the present invention and mounted within a frame affixed to a house;

FIG. 2 is a fragmentary elevational view of the inside wall portion at which room air flow communication with the module is established;

FIG. 6 is a fragmentary elevational view showing the lower right hand corner portion of the solar module and frame of FIG. 1, drawn to a greatly enlarged scale;

FIG. 7 is a vertical sectional view showing the plenum box assembly mounted within the outside wall of the house, and connected to the solar collector module mounted thereupon; and FIG. 8 is a schematic representation of the interior of the solar collector module, illustrating the air flow path therethrough and depicting the relationship to the outlet and inlet passages of the plenum box.

DETAILED DESCRIPTION OF THE ILLUSTRATED EMBODIMENT

Turning now in detail to FIG. 1 of the appended drawings, therein illustrated is a solar collector module, generally designated by the numeral 10, mounted within a frame structure, generally designated by the numberal 12, upon a house 14. As will be noted, the module 10 extends substantially to the full height of the house 14.

Figure 3:
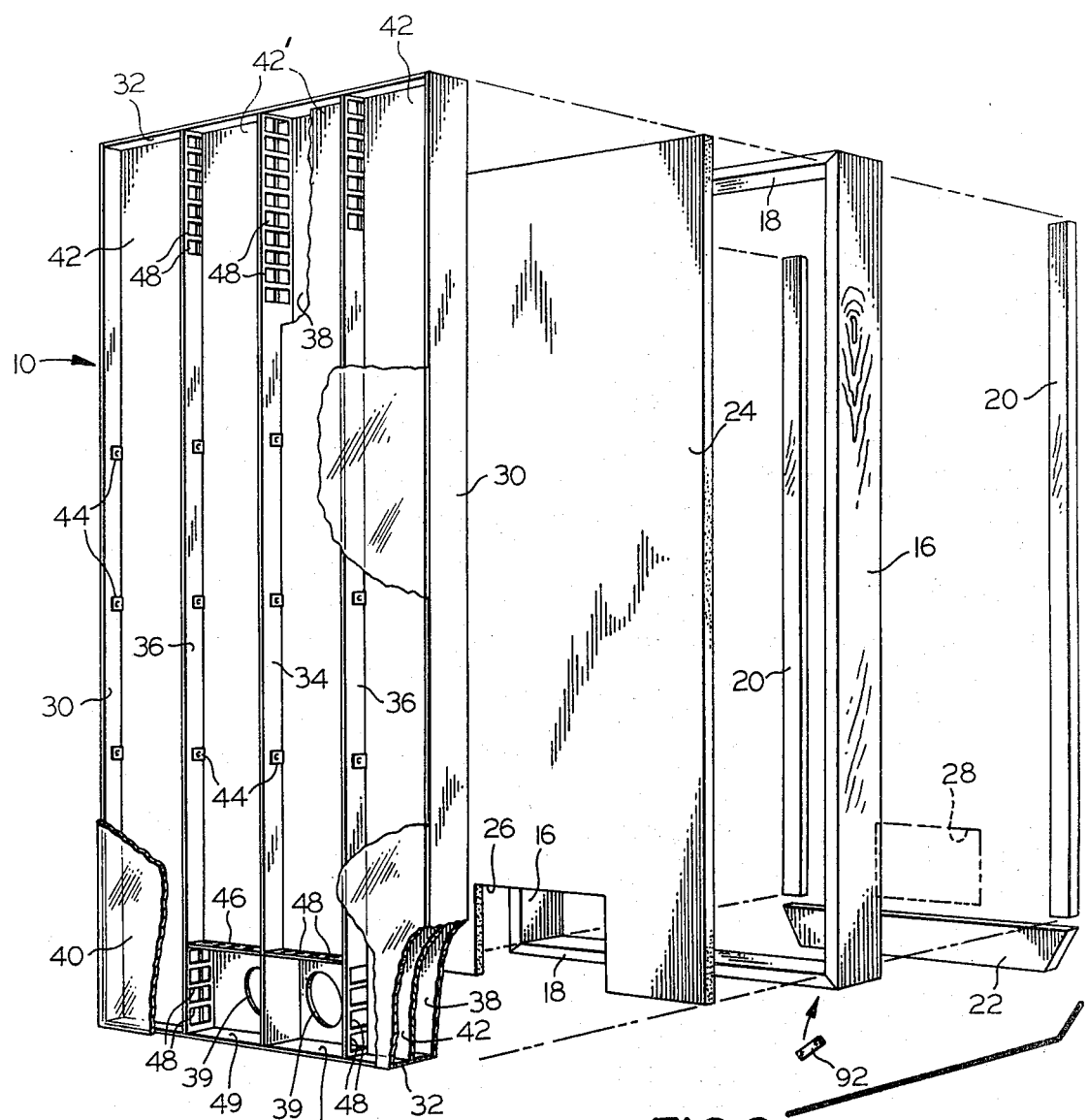
FIG. 3 is an exploded, fragmentary perspective view of the solar collector module and mounting frame of FIG. 1, drawn to a somewhat enlarged scale.

The construction of the module 10 and the frame 12 is best seen in FIG. 3, the latter comprising a rectangular structure consisting of vertical members 16 and horizontal boards 18, 2"×6" boards being suitable for the purpose. Two uprights 20 are fastened to the side of the house by nails or the like, and an underlying ledge or sill 22 is similarly attached. As will be appreciated, the rectangular frame 12 is dimensioned and configured to fit over the uprights 20, which serve primarily to provide lateral support, and to rest upon the sill 22; it is secured in position by bolting or other appropriate means. A panel of insulating material 24 (such as R-MAX, made by the R-Max Corporation of Dallas, Tex.), dimensioned and configured to fit within the frame 12, is secured upon the rights 20, and has a rectangular opening 26 cut into its bottom edge, which corresponds to the opening 28 cut through the side of the house, as shown in phantom line.

The solar collector module 10 consist of an outside frame made of vertical and horizontal members 30, 32, such as of extruded aluminum, and is divided into four vertical sections by internal upright members 34, 36. The rear panel of the module is provided by a plastic sheet 38, and the front comprises a glass pane or other glazing 40. Interposed therebetween are four, elongated heat absorber panels 42, 42', which are secured (such as with threaded fasteners) to the vertical members 30, 34, 36 by the small tab portions 44 that project from lateral margins thereof; the panels 42, 42' will be discussed in greater detail hereinbelow.

A cross-piece 46 extends between the internal upright members 36 at a point spaced from the lower horizontal member 32, to cooperatively define a rectangular enclosure within the lower portion of the module. As will be noted, the lower end portions of the vertical members 36, which cooperate with the cross-piece 46 to define the rectangular enclosure, have slot-like apertures 48 formed therethrough to permit air flow communication. The upper end portions of all three upright members 34, 36 are similarly slotted, as is the cross-piece 46, although the slots 48 therein are less apparent in FIG. 3. As can be seen, the lower end of the vertical member 34 is, on other hand, imperforate, thereby dividing the enclosed area into two separate compartments 49, 51, between which direct air flow does not occur; circular apertures 39 are formed through the back panel 38 to provide air flow communication with each of the compartments. It is to be noted that the two innermost heat absorber panels 42' do not extend the full length of the module 10, as do the outer panels 42; rather, they terminate at the horizontal cross-piece 46, and do not therefore subdivide the space within the enclosure, as is necessary to permit free air flow over both surfaces of the absorber panels 42'.

Figure 4:
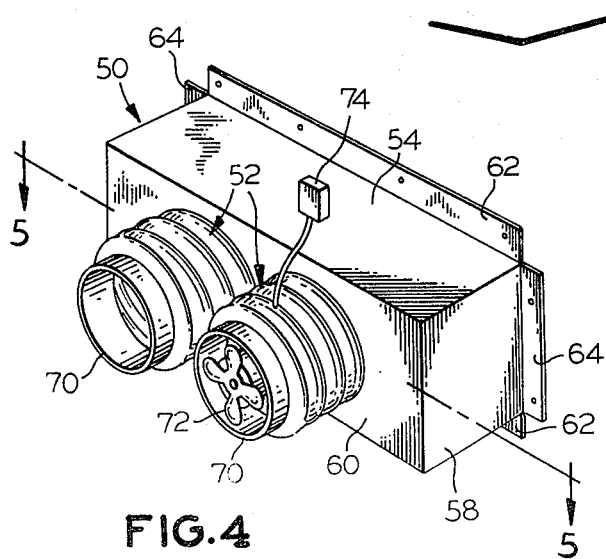
FIG. 4 is a perspective view of the plenum box assembly utilized in the system of the invention.
Figure 5:
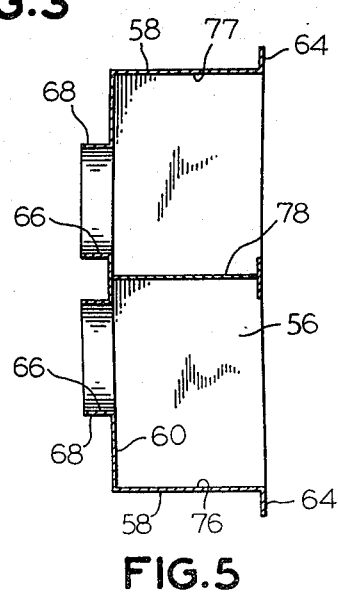
FIG. 5 is a section view, taken along line 5—5 of FIG. 4, of the box utilized in the assembly shown therein.

Turning now to FIGS. 4 and 5, the plenum box assembly is shown in detail therein, and consists of a sheet metal box, generally designated by the numeral 50, and a pair of flexible conduits, each generally designated 52. The box consists of a top wall 54, a bottom wall 56, end walls 58 and rear wall 60. The front side of the box 50 is open, and is bordered by flange portions 62, 64, which are attached to the top and bottom walls 54, 56 and end walls 58, respectively. The rear wall 60 of the box has a pair of circular passages 66 formed through it, which are circumscribed by collar portions 68. One of the flexible conduits 52 is mounted over each of the collar portions 68 and is secured thereon by a suitable clamp (not illustrated), and a separate collar portion 70 is inserted into the opposite end of each conduit 52, and is simiarly secured therein. A fan or blower 72 is mounted within one of the conduits 52, which blower is controlled by a thermostat 74. The interior of the box 50 is divided into two compartments 76, 77 by a vertical barrier 78, which extends between the two passages 66.

FIG. 7 illustrates the assembly of the system in the wall of a house, shown to be comprised of a 2'×4' stud 80, an inside sheetrock panel 82, outside sheathing 84 and shingles 86. The uprights 20 are, as previously indicated, nailed over the singles 86, and the frame pieces 18, 22 are disposed in the relationships described. The insulating panel 24 is secured against the upright 20, and the solar collector module 10 is shown in place thereagainst.

The box 50 of the plenum box assembly is fastened by nails through the flange portions 62 to the sheetrock 82, and a standard register plate 88 is mounted thereover; the box extends substantially through the wall structure of the house, and the flexible conduits 52 (only one of which is visible in FIG. 7) extend therefrom to the solar panel 10. As will be noted, the collar 70 provided within the opening of each of the conduits 52 is engaged within the corresponding aperture 39 of the plastic sheet backing panel 38, and extends a short distance into the enclosed space (only compartment 51 being shown). The thermostat 74 is engaged within a suitable opening provided in the plastic panel 38, for exposure to the hot air flowing through the adjacent passage. The solar module 10 is secured within the frame 12 by suitable bolts (one of which is seen in FIG. 6), and by flat metal reinforcing bars 92, which are provided at each of the corners.

FIG. 2 shows the inside wall 82 of the room with which the system communicates, and best illustrates the register plates 88 through which the air passes into and from the plenum box 50. The wire and plug 94 from the blower 72 is shown inserted into a standard wall receptacle 96 for house current.

In FIG. 8, the flow pattern of air through the module 10 is illustrated. Under the influence of the blower 72, it passes from the plenum compartment 76 through the associated passage 66 of the plenum box 50 and into the channels A and B defined on the right-hand side of the panel assembly, for parallel flow in an upward direction; as will be noted, the air passes through the apertures 48 of the cross-piece 46 into the channel B, and through the apertures in the lower portion of the vertical member 36 into the channel A. At the top of the module the air flows through the apertures of members 34 and 36 into the upper portion of the two channels C and D defined on the left-hand side thereof. It circulates downwardly, passing through the apertures 48 in the left side of cross-piece 46 and in the left-hand vertical member 36, and finally through the corresponding aperture 39 in the plastic sheet 38 and into the room through the other passageway 66 and the compartment 77 of the plenum box 50. Although not depicted in this Figure, it will be understood that, in so circulating through the module 10, the air passes simultaneously on both sides of the heat absorber panels 42, 42', thereby taking advantage of the full surface area presented thereby for maximum heat transfer efficiency.

As seen in FIG. 7, the solar collector module 10 and the plenum box 50 are so mounted that their respective openings (i.e., the apertures 39 and the passages 66) are not in axial alignment. This may be due to any of several factors which have been mentioned hereinabove, such as the presence of a sill, plate, or other obstruction, which prevents installation of the plenum box in an aligned position. Despite this (and in some instances the misalignment may be much more pronounced), it is seen that the flexible conduits 52 effectively establish communication for maximum volumetric flow rates, and in turn optimal thermal energy recovery. As will be appreciated, the space available between the plenum box 50 and the solar module 10 is minimal (i.e., on the order of about three to four inches, in a typical case), making satisfactory interconnection impossible in the absence of the flexible conduits utilized in accordance with the present invention; in any event, the use of such conduits greatly facilitates the establishment of the necessary physical interconnections.

As noted above, the utilization of a solar collector panel of relatively large surface area is highly desirable from the standpoint of achieving maximum heating efficiency. Obviously, the greater the surface area the greater will be the amount of solar radiation that can be collected and converted into thermal energy, this, in turn, means that a greater volumetric flow rate of air through the module can be achieved, thus permitting lower operating temperatures. For example, whereas a four by eight unit operates effectively at a temperature of about 90° Fahrenheit, to approach a comparable level of heat recovery, a three by seven module would have to operate at a temperature of about 110° Fahrenheit. The latter results in wide temperature swings and nonuniform delivery of heat to the living space; it is also undesirable from the standpoint of the longevity of the system and excessive heat losses, the latter being due, of course, to the establishment of relatively high thermal driving forces. It will be understood that, in normal operation, the thermostat of the system will be set for a given temperature, and will actuate the blower motor when the set point temperature has been attained within the solar collector module.

Although the system of the invention is most beneficially utilized as a retrofit unit, it should be appreciated that utility is not so limited, and that it can be installed as an integral part of an original wall structure. Moreover, although specific materials of construction have been mentioned hereinabove, alternatives may be employed without departing from the concepts of the invention; materials specified are intended only to be exemplary, and alternatives, as well as certain details of construction, will be evident to those skilled in the art. For example, it will be appreciated that the solar radiation absorption panels will normally be of metal construction (i.e., of aluminum), with a coating thereon (produced by chemical treatment or separate application) to maximize black body radiation effects.

Thus, it can be seen that the present invention provides a novel active solar heating system which is adapted for retrofit installation in a building, with minimal structural modification thereto. The system utilizes a solar collector module of a standard size and relatively large effective surface area, for efficient heat recovery and utilization, and it permits facile placement of the room register to accommodate practical and aesthetic factors. In addition, the system is compact and self-contained, and can be produced and installed quickly, easily, and relatively inexpensively.

Having thus described the invention, what is claimed is:

1. An active solar heating system adapted for retrofit installation in a building, with minimal structural modification thereto, comprising:
 (1) a solar collector module adapted for mounting upon an outside building wall, including a frame having disposed therein a transparent front panel and a spaced generally parallel rear panel defining an air flow space therebetween, and at least one member dividing said space, in a plane perpendicular to the planes of said front and rear panels, into two chambers, said rear panel having a pair of adjacent apertures formed therethrough near one end of said module, one of said apertures communicating with each of said chambers and said apertures being substantially isolated from one another by said dividing member, said chambers being in air flow communication with one another adjacent the opposite end of said module, thereby establishing a double-pass air flow path between said apertures through said module; and
 (2) a plenum box assembly for actively circulating room air through said module, said assembly including:
  (a) a box defining a plenum with an open front side, and adapted for installation in an opening formed through the building wall, with said open side disposed to the interior of the building and lying substantially in the plane of the interior wall surface, said box having an internal barrier member dividing said plenum into two adjacent compartments, and a rear wall with a pair of passages formed therethrough, each communicating with one of said plenum compartments, (b) a pair of flexible conduits connected to said box and said module with one of said conduits providing air flow communication between one of said compartments of said plenum box and one of said chambers of said module through said passages and apertures thereof, respectively, and (c) blower means mounted substantially within one of said conduits for inducing such air flow circulation, whereby said system is readily installed by forming an opening through an outside wall of the building, mounting said module exteriorly thereon and mounting said plenum box within said opening, and establishing air flow communication between said module and said box by connecting said conduits therebetween.

2. The system of claim 1 wherein said solar collector module additionally includes at least one panel for absorption of solar radiation and conversion of such radiation to thermal energy, said absorption panel being substantially planar and being spaced between and in a plane parallel to said front and rear panels of said module, to subdivide said chambers thereof and to define air flow passages on both sides of said absorption panel.

3. The system of claim 1 wherein said solar collector module includes a plurality of said dividing members.

4. The system of claim 1 wherein said panel is about eight feet long and four feet wide.

5. In a method of retrofitting a solar collector module into an existing building structure, to produce an active supplemental heating system, the steps comprising: forming an opening through an outside wall of the building; constructing a mounting framework on the exterior of said outside wall generally about said opening; mounting a solar collector module exteriorly on said wall within said framework; mounting a plenum box within said opening; and establishing air flow communication between said module and said box; said solar collector module including a frame having disposed therein a transparent front panel and a spaced generally parallel rear panel defining an air flow space therebetween, and at least one member dividing said space, in a plane perpendicular to the planes of said front and rear panels, into two chambers, said rear panel having a pair of adjacent apertures formed therethrough near one end of said module, one of said apertures communicating with each of said chambers and said apertures being substantially isolated from one another by said dividing member, said chambers being in air flow communication with one another adjacent the opposite end of said module, thereby establishing a double-pass air flow path between said apertures through said module; and said plenum box assembly including:

(a) a box defining a plenum with an open front side, and adapted for installation in an opening formed through the building wall, with said open side disposed to the interior of the building and lying substantially in the plane of the interior wall surface, said box having an internal barrier member dividing said plenum into two adjacent compartments, and a rear wall with a pair of passages formed therethrough, each communicating with one of said plenum compartments, (b) a pair of flexible conduits connected to said box and said module with one of said conduits providing air flow communication between one of said compartments of said plenum box and one of said chambers of said module through said passages and apertures thereof, respectively, and (c) blower means mounted substantially within one of said conduits for inducing such air flow circulation, said air flow communication between said module and said box being established by connecting said conduits therebetween.

6. The method of claim 5 wherein said module and said wall are of substantially the same length, and wherein said box and module are disposed with said apertures and passages thereof, respectively, substantially misaligned.

* * * * *